(12) United States Patent
Vankipuram et al.

(10) Patent No.: US 11,991,263 B2
(45) Date of Patent: May 21, 2024

(54) NOTIFICATION DELIVERY IN A VIRTUAL SPACE BASED ON A USER BEING IN A FLOW STATE

(71) Applicant: Hewlett-Packard Development Company, L.P., Spring, TX (US)

(72) Inventors: Mithra Vankipuram, Palo Alto, CA (US); Sarthak Ghosh, Palo Alto, CA (US); Rafael Antonio Ballagas, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 113 days.

(21) Appl. No.: 17/611,295

(22) PCT Filed: Sep. 17, 2019

(86) PCT No.: PCT/US2019/051531
§ 371 (c)(1),
(2) Date: Nov. 15, 2021

(87) PCT Pub. No.: WO2021/054941
PCT Pub. Date: Mar. 25, 2021

(65) Prior Publication Data
US 2022/0239762 A1    Jul. 28, 2022

(51) Int. Cl.
| | |
|---|---|
| *H04L 67/75* | (2022.01) |
| *G06F 3/01* | (2006.01) |
| *G16Y 20/40* | (2020.01) |
| *H04W 4/14* | (2009.01) |

(52) U.S. Cl.
CPC .............. *H04L 67/75* (2022.05); *G06F 3/016* (2013.01); *G16Y 20/40* (2020.01); *H04W 4/14* (2013.01); *G06F 2203/011* (2013.01)

(58) Field of Classification Search
CPC ........ H02J 50/001; G06F 1/187; G06F 3/016; G06F 2203/011; G06Q 10/0833; G06Q 10/0832; G06Q 10/08; G16Y 20/40; H04W 4/14
See application file for complete search history.

(56) References Cited

U.S. PATENT DOCUMENTS

| | | | |
|---|---|---|---|
| 9,256,711 B2 * | 2/2016 | Horseman | G16H 40/63 |
| 9,719,871 B2 * | 8/2017 | Blum | G06F 3/013 |
| 10,171,858 B2 | 1/2019 | George et al. | |
| 10,366,521 B1 * | 7/2019 | Peacock | G02B 27/017 |
| 10,909,759 B2 * | 2/2021 | Kaino | G06F 3/048 |
| 2008/0146892 A1 | 6/2008 | LeBoeuf et al. | |
| 2008/0218331 A1 | 9/2008 | Baillot | |
| 2016/0335801 A1 | 11/2016 | Yoon et al. | |

(Continued)

FOREIGN PATENT DOCUMENTS

| | | |
|---|---|---|
| KR | 101901258 B1 | 9/2018 |
| WO | 2019/165432 A1 | 8/2019 |

*Primary Examiner* — Daniell L Negron
(74) *Attorney, Agent, or Firm* — Quarles & Brady LLP (57) ABSTRACT

Examples of methods for notification delivery are described herein. In some examples, a method may include determining a flow state of a user based on biometric data from a biometric sensor in an extended reality device. In some examples, the method may include determining a modality for notification delivery based on the flow state. In some examples, the method may include delivering the notification using the modality.

19 Claims, 4 Drawing Sheets

(56) References Cited

U.S. PATENT DOCUMENTS

| | | |
|---|---|---|
| 2017/0068925 A1 | 3/2017 | Sudo et al. |
| 2017/0169382 A1 | 6/2017 | Thapliyal et al. |
| 2017/0287305 A1 | 10/2017 | Alqudairi |
| 2018/0232056 A1 | 8/2018 | Nigam et al. |
| 2018/0276891 A1 | 9/2018 | Craner |

* cited by examiner

NOTIFICATION DELIVERY IN A VIRTUAL SPACE BASED ON A USER BEING IN A FLOW STATE

BACKGROUND

Electronic technology has advanced to become virtually ubiquitous in society and has been used to improve many activities in society. For example, electronic devices are used to perform a variety of tasks, including work activities, communication, research, and entertainment. Electronic technology is often utilized to present audio and/or video content. For instance, computing devices may be utilized to present user interfaces for applications. Electronic technology is also utilized to provide communication in the form of email, instant messaging, video conferencing, and Voice over Internet Protocol (VoIP) calls.

DETAILED DESCRIPTION

Electronic devices may be utilized to present content. Content is an electronically produced output that is perceivable by a user. Examples of content include images, videos, audio, etc. For instance, extended reality images (e.g., video), audio, a user interface on a display, video games, etc., are examples of content. In some examples, a user may perform a task related to the content. For instance, a user may utilize a user interface to create a drawing, write a document, write programming instructions, play a videogame, etc.

Extended reality is simulated content that augments or replaces real-world environment(s) and/or object(s). A user may experience extended reality with an extended reality device. An extended reality device is a device that produces extended reality. Examples of extended reality devices include electronic devices, computing devices, headsets, virtual reality headsets, augmented reality headsets, mixed reality headsets, etc. For instance, an extended reality device may produce extended reality content. In some examples, extended reality content may include images (e.g., video) and/or audio. Examples of extended reality include virtual reality, augmented reality, and mixed reality.

Virtual reality is a simulated environment. For example, virtual reality may include a simulated three-dimensional space. Virtual reality may provide an immersive experience for a user. For example, a user's visual field may be dominated by virtual reality images and/or a user's hearing may be dominated by virtual reality audio. In some examples, virtual reality may replace a user's perception of a real-world environment. For example, a virtual reality headset may cover a user's field of view of the real-world environment.

Augmented reality is simulated content that is superimposed on a real-world environment. For example, an augmented reality headset may superimpose simulated or virtual objects in a user's field of view of a real-world environment. The simulated or virtual objects may appear to add to the real-world environment and/or may appear to remove portions from the real-world environment. The simulated or virtual objects may be aligned with or registered to the real-world environment.

Mixed reality is simulated content in which a simulated or virtual object is integrated with a real-world object. For example, mixed reality may enable interaction with a hybrid object that includes a simulated or virtual object in combination with a real-world object. As used herein, the term "extended reality" may be used to refer individually to virtual reality, augmented reality, or mixed reality, or any combination of virtual reality, augmented reality, or mixed reality. An "extended reality device" may refer individually to a virtual reality device (e.g., virtual reality headset), augmented reality device (e.g., augmented reality headset, augmented reality visor, etc.), mixed reality device (e.g., mixed reality headset, mixed reality visor, etc.), or any combination thereof.

A flow state is a state of user engagement in a task. For example, a user may be in a flow state when the user is fully engaged in a task. In some examples, a user may achieve a flow state when using an extended reality device. For instance, a user may be fully engaged in a task (e.g., studying a topic. creating a drawing, drafting a document, designing a structure, playing a videogame, etc.) in extended reality, where the extended reality device may help to maintain the flow state due to the isolation from external stimuli and/or the immersion of the extended reality. A user may be productive when in a flow state. Disrupting or interrupting a user in the flow state may reduce user productivity.

A notification may disrupt or interrupt a flow state. A notification is a perceivable indication of an event. For example, a user may perceive an indication through a sense or combination of senses (e.g., vision, hearing, touch, etc.). Examples of notifications include a phone ring, a controller vibration, an email pop-up window, a timer chime, etc. A notification may be provided with a modality. A modality is a mechanism or mechanisms to interface with a user. Examples of modalities include visual modalities (e.g., displays, screens, projectors, etc.), audio modalities (e.g., speakers, headphones, etc.), haptic modalities (e.g., actuators, motors, eccentric rotating mass (ERM) actuators, linear resonant actuators (LRAs), piezoelectric actuators, ultrasound transducers, etc.), and combinations thereof (e.g., audio-visual-haptic, audio-haptic, visual-haptic, and audio-visual). For instance, a notification for a phone call may be delivered using an audio-visual-haptic modality by providing a phone ring on headphones or speakers with a controller vibration and an image of the caller on an extended reality display. Some examples of the techniques described herein may modulate a modality to deliver a notification when a user is in a flow state. Some examples may be beneficial to reduce disruption to a flow state and/or to maintain a flow state. Accordingly, a user may be kept in a flow state while providing notifications, which may increase productivity and/or provide increased extended reality immersion.

Figure 1:
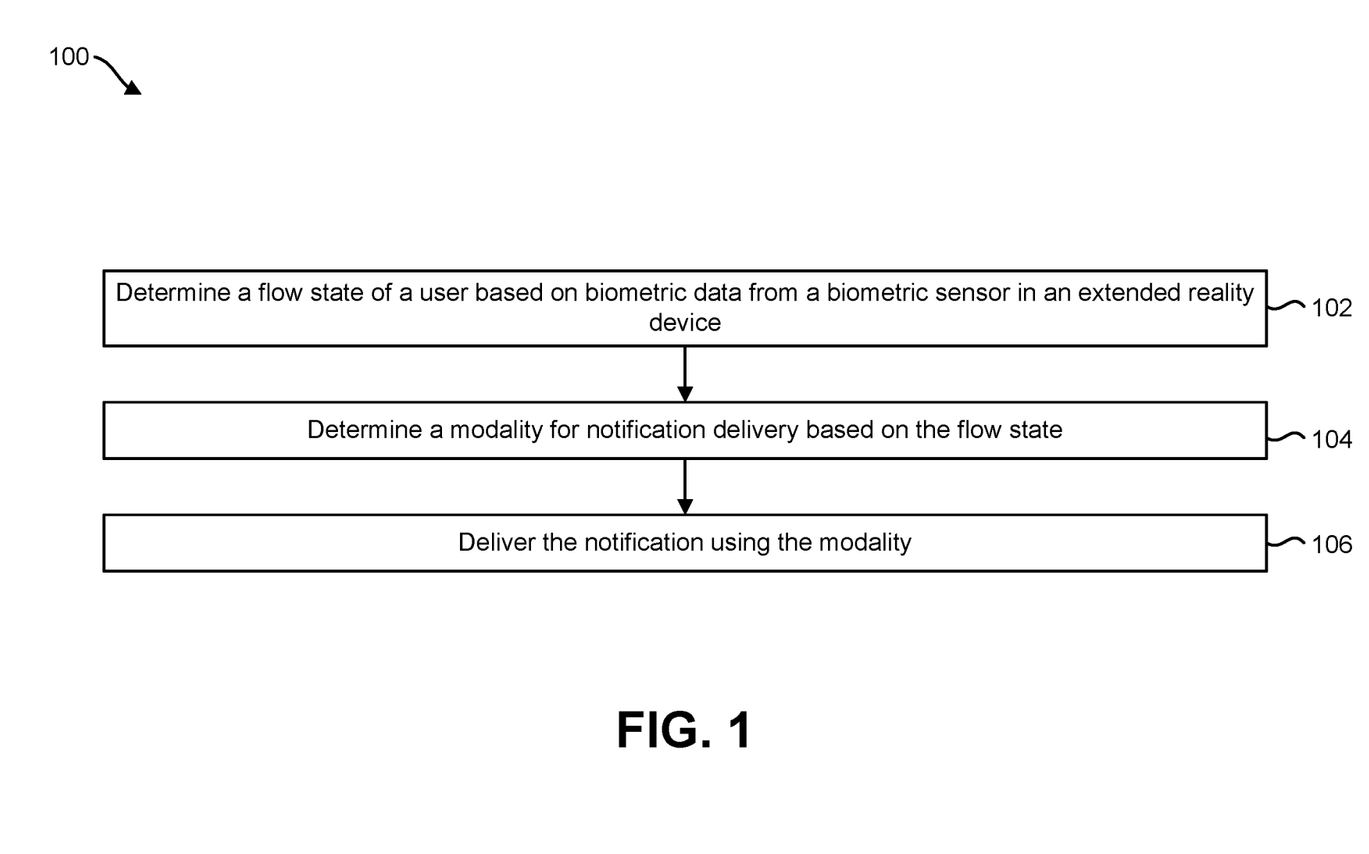
FIG. 1 is a flow diagram illustrating an example of a method for notification delivery.

Throughout the drawings, identical reference numbers may designate similar, but not necessarily identical, elements. Similar numbers may indicate similar elements. When an element is referred to without a reference number, this may refer to the element generally, without necessary limitation to any particular figure. The figures are not necessarily to scale, and the size of some parts may be exaggerated to more clearly illustrate the example shown. Moreover, the drawings provide examples and/or implemen- FIG. 1 is a flow diagram illustrating an example of a method 100 for notification delivery. The method 100 and/or a method 100 element or elements may be performed by an apparatus (e.g., electronic device, computing device, extended reality device, etc.). For example, the method 100 may be performed by the apparatus 302 described in connection with FIG. 3.

The apparatus may determine 102 a flow state of a user based on biometric data from a biometric sensor in an extended reality device. A biometric sensor is a sensor to detect biometric data from a user. Examples of biometric sensors include heart rate sensors, cameras, electromyography (EMG) sensors, microphones, electroencephalogram (EEC) sensors, etc. Biometric data is data that indicates a biological aspect or aspects of a user. Examples of biometric data include heart rate data, electrocardiograms (ECGs), images of a user, electromyograms, audio (e.g., speech, voice, etc.) from a user, electroencephalograms, etc.

In some examples, determining 102 the flow state of a user may include determining a cognitive load based on the biometric data. Cognitive load is an indication of an amount of mental activity of a user. Cognitive load may be expressed as a number (e.g., a number within a range, such as 0 to 1, 0 to 10, etc.) and/or as a level (e.g., low, medium, high, etc.). In some examples, cognitive load may be determined using heart rate and pupillometry. For instance, the apparatus may measure a heart rate of a user using a heart rate sensor and may measure a pupil size (e.g., diameter, degree of dilation, etc.) of the user. For example, the extended reality device may include a heart rate sensor (in a headset and/or controller) and camera facing the user. The apparatus may provide the heart rate and pupil size to a function (e.g., machine learning model, mapping function, etc.). The function may map the heart rate and pupil size to a cognitive load.

In some examples, a camera and/or EMG sensor may be utilized to determine the cognitive load. For example, the apparatus may utilize the image(s) of the user and/or electromyogram to detect a frown. Frowning may indicate an amount of cognitive load. In some examples, the apparatus may perform facial motion tracking and/or pattern matching using the image(s) to determine whether a user is frowning. In some examples, the apparatus may perform electromyogram pattern matching to determine whether a user is frowning. In a case that the user is frowning, the apparatus may detect an amount of cognitive load. Determining 102 the flow state may be based on the cognitive load. For example, the apparatus may determine whether the cognitive load is within a threshold range that indicates the flow state. In some examples, cognitive load may be utilized in combination with another factor or factors to determine the flow state. Examples of factors may include cognitive load, emotional response, work progress indicator, and/or aggregation.

In some examples, determining 102 the flow state is based on emotional response. Emotional response is an indication of an emotional state of a user. Emotional response may be expressed as a category (e.g., positive, neutral, or negative). In some examples, the apparatus may determine an emotional response based on biometric data. For instance, the apparatus may determine the emotional response of an extended reality user by detecting facial action units with EMG, which may indicate facial muscle activations. A facial action unit is a facial motion. For instance, the apparatus may detect activation of facial muscles that correspond to a frown, relaxation (e.g., non-activation) of facial muscles, or activation of facial muscles that correspond to a smile. In some examples, the apparatus may utilize an image or images of the user with computer vision techniques to detect facial action units and estimate emotional response. In some examples, the apparatus may utilize heart rate and pupillometry sensing to determine emotional response.

In some examples, the apparatus may perform an analysis of speech patterns if user audio is available (e.g., when the user speaking, such as when the user is participating in teleconferencing in extended reality). For instance, the apparatus may extract features such as tone, pitch, words spoken, number of words spoken per minute, etc. The apparatus may utilize machine learning techniques (e.g., hidden Markov modeling) to differentiate between positive, neutral, and negative emotional responses. Determining 102 the flow state may be based on the emotional response. For example, the apparatus may determine whether the emotion response indicates the flow state. In some examples, emotional response may be utilized in combination with another factor or factors to determine the flow state.

In some examples, determining 102 the flow state may include determining a work progress indicator. A work progress indicator is an indication of progress in a task. Work progress may be expressed as a number (e.g., a number within a range, such as 0 to 1, 0 to 10, etc.), as a level (e.g., low, medium, high, etc.), and/or as a binary indicator (e.g., no or yes, 0 or 1, etc.). In some examples, determining the work progress indicator may be based on input device events. For example, the apparatus may detect extended reality controller events (e.g., button presses, motion, etc.), keyboard events (e.g., key presses), mouse events (e.g., mouse clicks, motion, etc.), touchscreen events (e.g., taps, swipes, etc.), etc. In some examples, work progress may be determined with a threshold amount of input device events (e.g., frequency of button presses, motions, etc.).

In some examples, work progress may be determined based on data from an application. For example, the apparatus may obtain data about an application in focus (e.g., an application being interacted with) to determine the work progress indicator. For instance, if the application in focus is a word processing application, data such as words written per minute or document length may be utilized to determine the work progress indicator. If the application in focus is an email application, number of emails responded to or emails filed away may be utilized to determine the work progress indicator. For instance, if the data from the application meets a criterion or criteria (e.g., threshold words written per minute, document length increase, number of emails responded to, etc.), the work progress indicator may be determined affirmatively (e.g., yes). Otherwise, the work progress indicator may be determined negatively (e.g., no). Determining 102 the flow state may be based on the work progress indicator. For example, the apparatus may determine whether the work progress indicator indicates the flow state. In some examples, the work progress indicator may be utilized in combination with another factor or factors to determine the flow state.

In some examples, determining 102 the flow state may include aggregating a plurality of previous flow state indications within a period. For instance, the apparatus may repeatedly (e.g., periodically, once every 10 seconds, 30 seconds, minute, etc.) make a flow state indication determination. A flow state indication is an indication of a flow state for a point in time. For example, the apparatus may determine whether a user is in a flow state at a point in time (based on a factor or factors taken at that time or within a time range, for instance). In some examples, a current flow state determination 102 may be based on an aggregation of a plurality of previous flow state indications. Aggregating flow state indications may include combining a plurality of flow state indications. Examples of aggregations include averages, proportions, ratios, etc. For instance, if a proportion (e.g., percentage, 40%, 50%, 60%, 75%, 90%, etc.) of previous flow state indications within a period (e.g., two minutes, five minutes, ten minutes, etc.) indicate a flow state, the apparatus may determine 102 that the user is currently in a flow state. In some examples, determining 102 the flow state may be based on the aggregation. In some examples, the aggregation may be utilized in combination with another factor or factors to determine the flow state.

In some examples, the apparatus may determine 102 the flow state using a conditional approach. For example, the apparatus may determine 102 that the user is in a flow state if a criterion or criteria are satisfied. For instance, the apparatus may determine that a user is in a flow state if a cognitive load criterion is satisfied, if an emotional response criterion is satisfied, if a work progress criterion is satisfied, and/or if an aggregation criterion is satisfied. In some examples, if the cognitive load criterion is satisfied (e.g., a range of cognitive load, medium or high cognitive load, etc.), if the emotional response criterion is satisfied (e.g., emotional response is neutral or positive), and if the work progress criterion is satisfied (e.g., work progress indicator is yes), then the apparatus may determine 102 that the user is in a flow state.

In some examples, the apparatus may determine 102 the flow state using a machine learning approach. Machine learning is a technique where a machine learning model is trained to perform an operation based on examples or training data. For example, an apparatus may utilize a machine learning model that is trained to infer a flow state based on training data including cognitive loads, emotional responses, work progress indicators, and/or aggregations. Examples of machine learning models may include artificial neural networks (e.g., fully connected neural networks (FCNNs)), support vector machines, decision trees, clustering, k-nearest neighbor classification, etc. In some examples, the apparatus may provide the cognitive load, emotional response, work progress indicator, and/or aggregation to a trained machine learning model. The machine learning model may be trained to infer the flow state based on the cognitive load, emotional response, work progress indicator, and/or aggregation. Accordingly, the machine learning model may indicate whether the user is in the flow state based on the cognitive load, emotional response, work progress indicator, and/or aggregation.

The apparatus may determine 104 a modality for notification delivery based on a flow state. In some examples, determining 104 the modality for notification delivery may be performed for a notification at the time that the notification occurs and/or is received. For instance, the apparatus may determine 104 the modality when a phone call is received, when an email is received, when an instant message is received, when an alarm expires, when a timer expires, when a paging message is received, etc. In some examples, determining 104 the modality may not include determining whether to enable or disable a notification and/or may not include determining whether to delay a notification.

In some examples, determining 104 the modality may include selecting a modality from a set of modalities and/or modifying or modulating (e.g., changing) a modality for notification delivery based on a flow state. In some examples, a set of modalities may include an audio modality, a visual modality, and/or a haptic modality. In some examples, a set of modalities may include an audio modality, a visual modality, a haptic modality, an audio-visual modality, a visual-haptic modality, an audio-haptic modality, and/or an audio-visual-haptic modality. In some examples, different modalities may provide different degrees of intrusiveness and/or noticeability. For example, an audio modality may provide a higher degree of intrusiveness and/or noticeability than a visual modality. In some examples, determining 104 the modality may include selecting a less intrusive and/or less noticeable modality in response to determining that the user is in a flow state. For example, determining 104 the modality for notification delivery may include selecting a visual modality for the notification of a phone call in response to determining that the user is in a flow state.

In some examples, the modalities may be ranked or categorized according to intrusiveness and/or noticeability. For example, a first category with highest intrusiveness and/or noticeability may include an audio-visual-haptic modality, followed by a second category including audio-haptic, audio-visual, and audio modalities, followed by a third category including visual-haptic and haptic modalities, followed by a fourth category with the least intrusiveness and/or noticeability including a visual modality. Other categorizations and/or rankings may be utilized.

In some examples, determining 104 the modality may include utilizing a default modality for notification delivery in response to determining that the user is not in the flow state. For example, types of events or communication types may have corresponding default modalities. In some examples, a phone call or instant message may have an audio-visual-haptic modality as a default modality. A voicemail, text message, or email may have an audio-visual modality as a default modality. A timer or alarm may have an audio-haptic modality as a default modality. Other examples of event types may have other default modalities. For instance, a text message may have an audio modality as a default modality. In some examples, determining 104 the modality may include modifying or modulating the modality from a default modality when the user is in a flow state. For example, the apparatus may reduce the rank of the flow state (by a category or categories, for instance) in response to determining that the user is in the flow state. For example, the apparatus may reduce a phone call notification from an audio-visual-haptic default modality to a haptic or haptic-visual modality when the user is in a flow state. In another example, the apparatus may reduce a text message notification from an audio-visual default modality to a visual modality.

In some examples, determining 104 the modality for notification delivery may include determining a distance in a virtual space for notification delivery based on the flow state. A virtual space is graphically rendered three-dimensional (3D) space. A notification may be presented visually in the 3D space. A distance in virtual space between a virtual camera (e.g., viewpoint of the user) and the notification may be determined based on whether the user is in the flow state. For example, determining the distance may include determining a first distance (e.g., 10 feet) in response to determining that the user is in the flow state or determining a second distance (e.g., 5 feet) in response to determining that the user is not in the flow state, where the first distance is greater than the second distance. For instance, a visual notification may appear closer to the user in a case that the user is not in the flow state, or may appear farther from the user in a case that the user is in the flow state. The visual notification may be presented with a visual modality, visual-haptic modality, audio-visual modality, or audio-visual haptic modality with a distance determined based on the flow state.

The apparatus may deliver 106 the notification using the modality. For example, the apparatus may deliver 106 (e.g., present, output, etc.) the notification using the default modality in a case that the user is not in the flow state, or may deliver 106 the notification using the modified or modulated (e.g., selected) modality in a case that the user is in the flow state. For instance, the apparatus may output a sound (e.g., ring, chime, speech, etc.), present a visual indicator (e.g., icon, image, etc.), and/or activate a haptic actuator according to the modality. In some examples, an element or elements of the method 100 may be omitted or combined.

Figure 2:
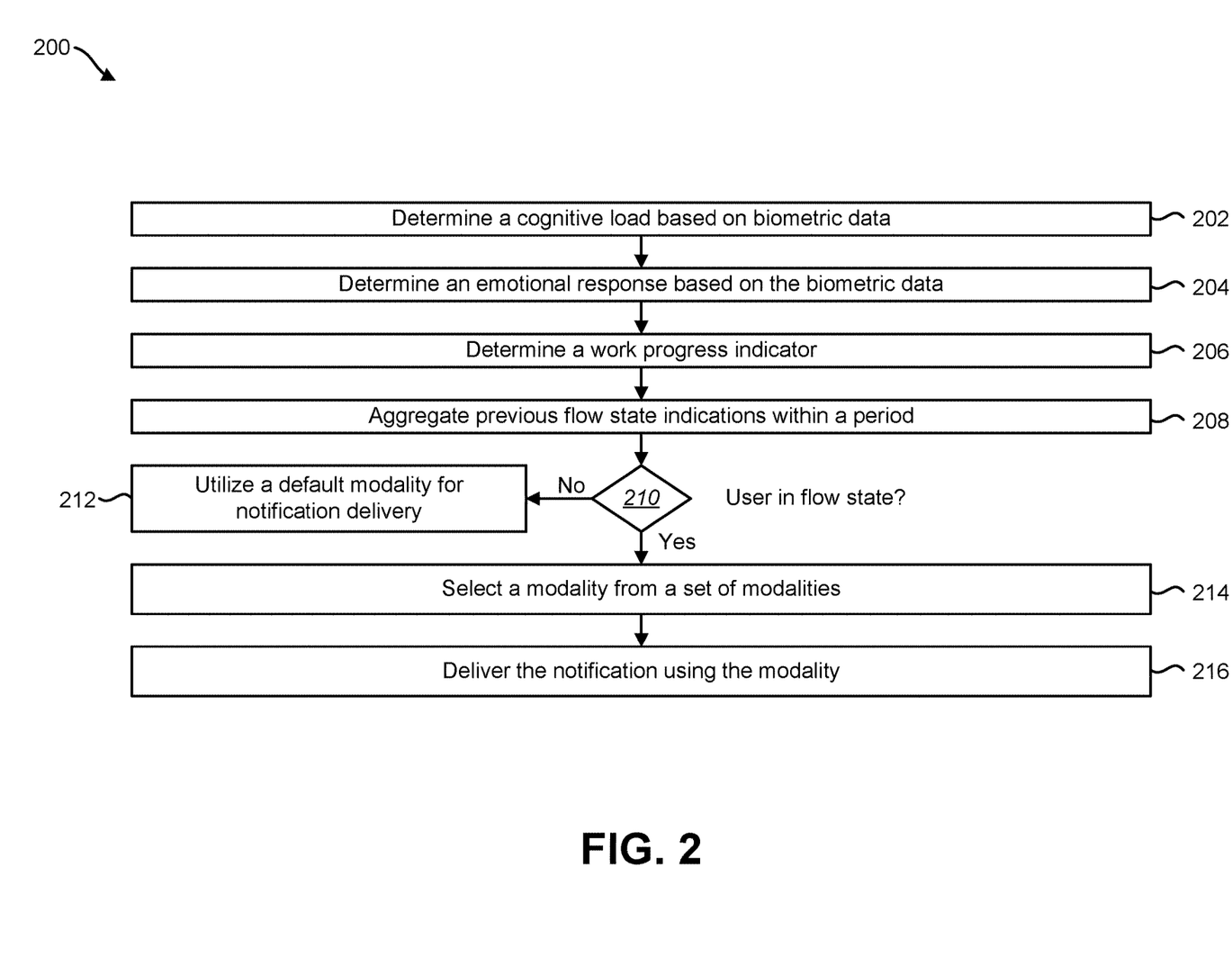
FIG. 2 is a flow diagram illustrating an example of a method for notification delivery.

FIG. 2 is a flow diagram illustrating an example of a method 200 for notification delivery. The method 200 may be an example of the method 100 described in connection with FIG. 1. The method 200 and/or a method 200 element or elements may be performed by an apparatus (e.g., electronic device, computing device, server, extended reality device, etc.). For example, the method 200 may be performed by the apparatus 302 described in connection with FIG. 3.

The apparatus may determine 202 a cognitive load based on biometric data. For example, determining 202 the cognitive load may be performed as described in connection with FIG. 1.

The apparatus may determine 204 an emotional response based on the biometric data. For example, determining 204 the emotional response may be performed as described in connection with FIG. 1.

The apparatus may determine 206 a work progress indicator. For example, determining 206 the work progress indicator may be performed as described in connection with FIG. 1.

The apparatus may aggregate 208 previous flow state indications within a period. For example, aggregating 208 previous flow state indications may be performed as described in connection with FIG. 1.

The apparatus may determine 210 whether a user is in a flow state based on the cognitive load, the emotional response, the work progress indicator, and the aggregation. For example, determining 210 whether a user is in a flow state may be performed as described in connection with FIG. 1. For instance, the apparatus may utilize a conditional approach and/or a machine learning approach. In some examples, if the cognitive load criterion, the emotional response criterion, and the work progress criterion are satisfied, and if the aggregation criterion is satisfied, the apparatus may determine that the user is in a flow state. Otherwise, the apparatus may determine that the user is not in a flow state.

In some examples, a user may be in a flow state when in a state with a combination of a target cognitive load with work progress being accomplished. In an extended reality training simulation, for instance, work progress may include completing the training simulation with satisfaction, which may be indicated by the emotional response. In another scenario, a user may be in a flow state when in a state with a target cognitive load combined with checking off tasks on a to-do list, answering emails or expanding a document, any of which may be detectable by analyzing input device (e.g., keyboard, mouse, controller, etc.) events with the task. Emotional responses may also be detected for use in detecting the flow state. In some examples, the flow state may be detected with a combination of a target cognitive load, emotional response, and work progress. For instance, the apparatus may determine the flow state by determining that the user has a medium or high cognitive load, a positive or neutral emotional response, and the presence of work progress. In some examples, a cognitive load may be beyond a target range, in which case the cognitive load may be accompanied by a negative emotional response, which may indicate a lack of flow state.

In a case that the user is not in a flow state, the apparatus may utilize 212 a default modality for notification delivery. For example, utilizing 212 the default modality may be performed as described in connection with FIG. 1.

In a case that the user is in the flow state, the apparatus may select 214 a modality from a set of modalities. For example, selecting 214 a modality may be performed as described in connection with FIG. 1. For instance, the apparatus may modify or modulate the modality from the default modality to another modality that is less intrusive and/or less noticeable. In some examples, the apparatus may select a visual modality instead of an audio modality for the notification. In some examples, the apparatus may determine a distance in the virtual space that is farther than a default distance for visual notifications.

In some examples, for immersive extended reality applications, notifications delivered with a visual modality may be less intrusive compared to other modalities (e.g., audio, audio-haptic, audio-visual, haptic, and/or visual-haptic) due to reduced noticeability of the visual modality. In some examples, the modality utilized for notification delivery may be modulated to a less intrusive modality during a flow state.

In some examples, a modality for notification delivery may be modulated to be more intrusive and/or noticeable for urgent or time sensitive notifications. In some examples, during states of high cognitive load, users may experience inattentional deafness, in which a user may become less responsive to visual content. For urgent notifications, if a high cognitive load is detected (e.g., a cognitive load greater than a threshold), the modality may be modulated from an audio modality to a haptic modality to help overcome potential inattentional deafness in some examples.

The apparatus may deliver 216 the notification using the modality. For example, delivering 216 the notification may be performed as described in connection with FIG. 1. For instance, the apparatus may deliver 216 the notification using the selected modality (e.g., the less intrusive and/or less noticeable modality). In some examples, an element or elements of the method 200 may be omitted or combined.

Figure 3:
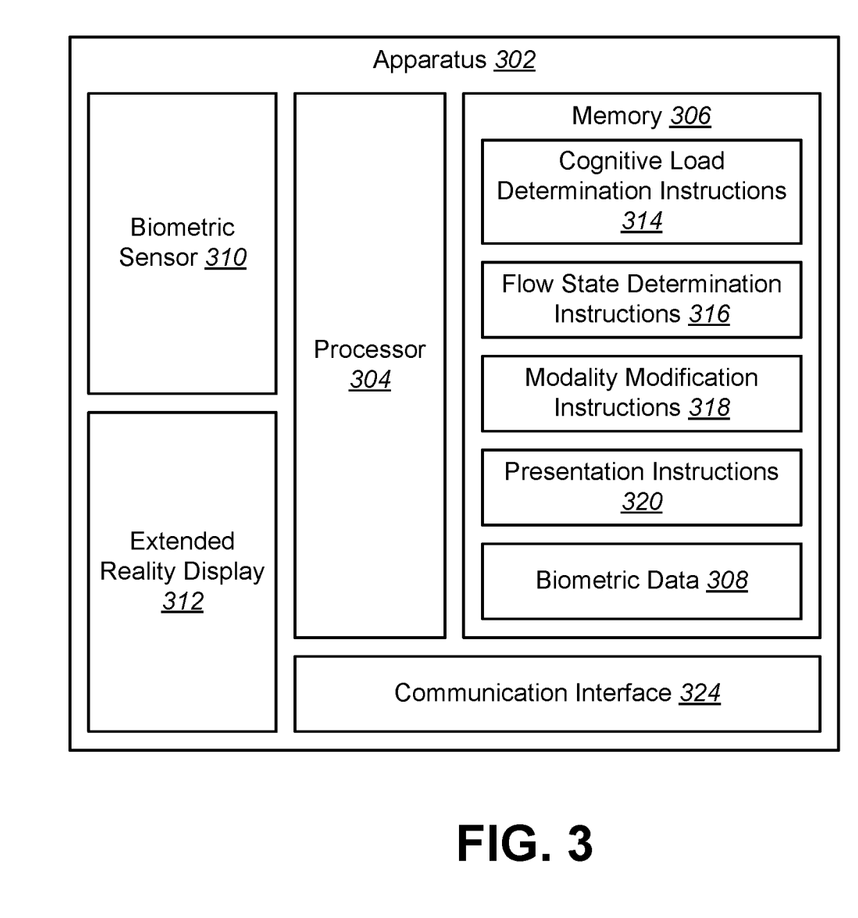
FIG. 3 is a block diagram of an example of an apparatus that may be used in notification delivery.

FIG. 3 is a block diagram of an example of an apparatus 302 that may be used in notification delivery. The apparatus 302 may be an electronic device, such as an extended reality device (e.g., headset, visor, goggles, glasses, etc.), computing device, personal computer, server, television, home theater, etc.). The apparatus 302 may include and/or may be coupled to a processor 304 and/or a memory 306. The apparatus 302 may include additional components (not shown) and/or some of the components described herein may be removed and/or modified without departing from the scope of this disclosure.

The processor 304 may be any of a central processing unit (CPU), a digital signal processor (DSP), a semiconductor-based microprocessor, graphics processing unit (GPU), field-programmable gate array (FPGA), an application-specific integrated circuit (ASIC), and/or other hardware device suitable for retrieval and execution of instructions (e.g., executable code) stored in the memory 306. The processor 304 may fetch, decode, and/or execute instructions stored in the memory 306. In some examples, the processor 304 may include an electronic circuit or circuits that include electronic components for performing a function or functions of the instructions. In some examples, the processor 304 may be implemented to perform one, some, or all of the functions, operations, elements, methods, etc., described in connection with one, some, or all of FIGS. 1-4.

The memory 306 is an electronic, magnetic, optical, and/or other physical storage device that contains or stores electronic information (e.g., instructions and/or data). The memory 306 may be, for example, Random Access Memory (RAM), Electrically Erasable Programmable Read-Only Memory (EEPROM), a storage device, an optical disc, and/or the like. In some examples, the memory 306 may be volatile and/or non-volatile memory, such as Dynamic Random Access Memory (DRAM), EEPROM, magnetoresistive random-access memory (MRAM), phase change RAM (PCRAM), memristor, flash memory, and/or the like. In some implementations, the memory 306 may be a non-transitory tangible machine-readable storage medium, where the term "non-transitory" does not encompass transitory propagating signals. In some examples, the memory 306 may include multiple devices (e.g., a RAM card and a solid-state drive (SSD)).

In some examples, the apparatus 302 may include a communication interface 324 through which the processor 304 may communicate with a device or devices (e.g., speakers, headphones, extended reality headset, monitors, TVs, display panels, etc.). In some examples, the apparatus 302 may be in communication with (e.g., coupled to, have a communication link with) a communication device (e.g., smart phone, smart watch, tablet device, laptop computer, router, networking device, etc.). In some examples, the apparatus 302 may be an extended reality device, computer (e.g., desktop computer, laptop computer, etc.), television, home theater, etc.

In some examples, the communication interface 324 may include hardware and/or machine-readable instructions to enable the processor 304 to communicate with the external device or devices. The communication interface 324 may enable a wired and/or wireless connection to the external device or devices. In some examples, the communication interface 324 may include a network interface card and/or may also include hardware (e.g., port(s)) and/or machine-readable instructions to enable the processor 304 to communicate with various input and/or output devices. Examples of output devices include an extended reality headset, display(s), headphones, speakers, etc. Examples of input devices include controllers (e.g., extended reality controllers), a keyboard, a mouse, a touch screen, etc., through which a user may input instructions and/or data into the apparatus 302. In some examples, the communication interface 324 may enable the apparatus 302 to communicate with a device or devices (e.g., servers, computers, etc.) over a network or networks. Examples of networks include the Internet, wide area networks (WANs), local area networks (LANs) (e.g., Wi-Fi), personal area networks (PANs) (e.g., Bluetooth), and/or combinations thereof. In some examples, an external device or external devices may communicate notifications to the apparatus 302. For example, a smart phone, computer, laptop, or network device may send a phone call, VoIP call, text, or email notification to the apparatus 302. The apparatus 302 may receive the notification(s) and/or present the notification(s) in an extended reality interface in accordance with the techniques described herein (e.g., with a selected modality). In some examples, the apparatus 302 may generate and/or present the notification(s) in accordance with the techniques described herein (e.g., with a selected modality).

In some examples, the apparatus 302 may include a biometric sensor or sensors 310. For instance, an extended reality device (e.g., extended reality headset, extended reality controller(s), etc.) may include biometric sensor(s) 310. In some examples, the apparatus 302 may be linked to (e.g., may be in wired or wireless communication with) biometric sensor(s) that may provide biometric data to the apparatus 302. Examples of biometric sensors 310 include heart rate sensors, cameras, EMG sensors, microphones, EEC sensors, etc. The biometric sensor(s) 310 may produce biometric data corresponding to a user. Examples of biometric data include heart rate data, ECGs, images (e.g., video) of a user, electromyograms, audio (e.g., speech, voice, etc.) from a user, electroencephalograms, etc. In some examples, the processor 304 may use the biometric sensor(s) 310 to detect biometric data 308 of a user. For example, the processor 304 may control the biometric sensor(s) 310 to sense biometric data 308 from a user. The biometric data 308 may be stored in memory 306.

In some examples, the apparatus 302 may include an extended reality display or displays 312. In some examples, the extended reality display(s) 312 may include a display panel or panels, transparent surface(s), etc., for presenting images (e.g., video, visual notifications, etc.) to a user. For instance, the extended reality display(s) 312 may be integrated into an extended reality headset. In some examples, the apparatus 302 may be linked to (e.g., may be in wired or wireless communication with) extended reality display(s) that may present images (e.g., video, visual notifications, etc.). Examples of extended reality displays 312 include liquid crystal display (LCD) panels, organic light emitting display (OLED) panels, projectors, etc.

In some examples, the memory 306 of the apparatus 302 may store cognitive load determination instructions 314, flow state determination instructions 316, modality modification instructions 318, presentation instructions 320, and/or biometric data 308. The cognitive load determination instructions 314 are instructions for determining a cognitive load of the user based on the biometric data 308. For example, the processor 304 may execute the cognitive load determination instructions 314 to determine a cognitive load of a user as described in connection with FIG. 1 and/or FIG. 2.

The flow state determination instructions 316 are instructions for determining whether the user is in a flow state based on the cognitive load. For example, the processor 304 may execute the flow state determination instructions 316 to utilize the cognitive load to determine whether the user is in a flow state as described in connection with FIG. 1 and/or FIG. 2.

The modality modification instructions 318 are instructions for modifying a modality for notification delivery in response to determining that the user is in a flow state. For example, the processor 304 may execute the modality modification instructions 318 to modify a modality as described in connection with FIG. 1 and/or FIG. 2. For instance, the processor 304 may modify the modality from a default modality for a communication type.

The presentation instructions 320 are instructions for presenting the notification on the extended reality display 312 using the modified modality. For example, the processor 304 may execute the presentation instructions to present the notification on the extended reality display 312 as described in connection with FIG. 1 and/or FIG. 2.

Figure 4:
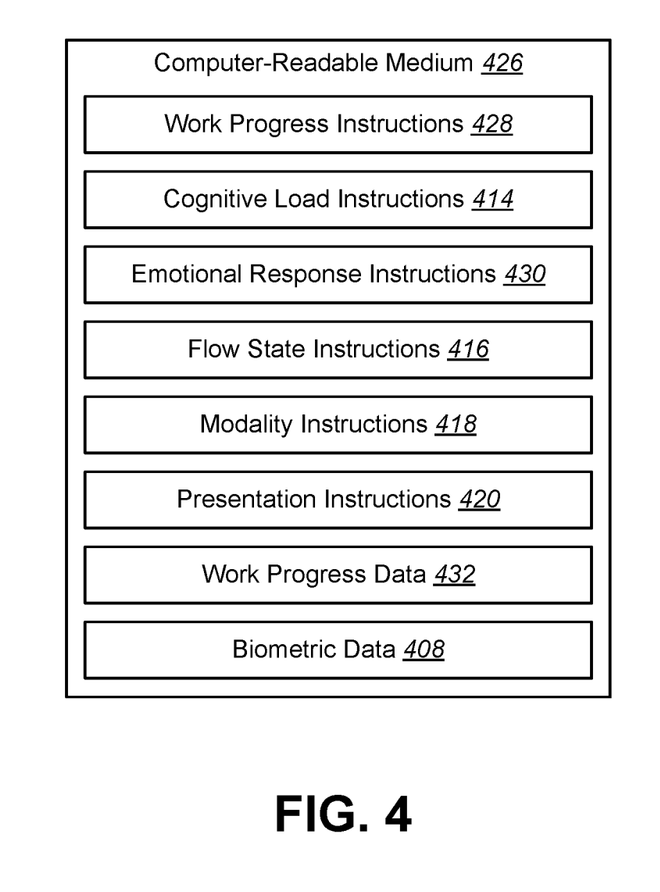
FIG. 4 is a block diagram illustrating an example of a computer-readable medium for notification delivery.

FIG. 4 is a block diagram illustrating an example of a computer-readable medium 426 for notification delivery. The computer-readable medium is a non-transitory, tangible computer-readable medium 426. The computer-readable medium 426 may be, for example, RAM, EEPROM, a storage device, an optical disc, and the like. In some examples, the computer-readable medium 426 may be volatile and/or non-volatile memory, such as DRAM, EEPROM, MRAM, PCRAM, memristor, flash memory, and the like. In some implementations, the memory 306 described in connection with FIG. 3 may be an example of the computer-readable medium 426 described in connection with FIG. 4. In some examples, the instructions and/or data stored in the computer-readable medium 426 may be examples of corresponding functions, instructions, and/or data described herein.

The computer-readable medium 426 may include code (e.g., data and/or instructions). For example, the computer-readable medium 426 may include work progress instructions 428, cognitive load instructions 414, emotional response instructions 430, flow state instructions 416, modality instructions 418, presentation instructions 420, work progress data 432, and/or biometric data 408. The work progress data 432 may be data corresponding to an input event or input events and/or an application or applications that indicate whether work progress is being made. The biometric data 408 may be data corresponding to a biological aspect or aspects of a user.

The work progress instructions 428 include code to cause a processor to determine a work progress indicator. For example, the work progress instructions 428 may be code to cause a processor to determine a work progress indicator based on work progress data 432. In some examples, the work progress instructions may include code to cause a processor to determine a work progress indicator as described in connection with FIG. 1 and/or FIG. 2. For instance, the work progress instructions 428 may be executed to determine whether the work progress data 432 indicates that a threshold amount of progress is being made on a task or tasks, in which case the work progress indicator may indicate that work progress is being made.

The cognitive load instructions 414 include code to cause a processor to determine a cognitive load. For example, the cognitive load instructions 414 may include code to cause a processor to determine a cognitive load based on the biometric data 408 as described in connection with FIG. 1, FIG. 2, and/or FIG. 3.

The emotional response instructions 430 include code to cause a processor to determine an emotional response. For example, the emotional response instructions 430 may include code to cause a processor to determine an emotional response based on the biometric data 408 as described in connection with FIG. 1 and/or FIG. 2.

The flow state instructions 416 include code to cause a processor to determine whether a user is in a flow state based on the work progress indicator, the cognitive load, and the emotional response. For example, the flow state instructions 416 may include code to cause a processor to determine a flow state as described in connection with FIG. 1, FIG. 2, and/or FIG. 3.

The modality instructions 418 include code to cause a processor to modulate a modality for a notification of a communication (e.g., phone call, email, text message, instant message, video call, etc.) in a case that the user is in the flow state. For example, the cognitive load instructions 414 may include code to cause a processor to modulate the modality as described in connection with FIG. 1, FIG. 2, and/or FIG. 3. For instance, the modality instructions 418 may include code to cause the processor to modulate the modality from an audio modality to a visual modality for a phone call.

The presentation instructions 420 include code to cause a processor to present the notification using the modality on an extended reality device. For example, the presentation instructions 420 may include code to cause a processor to present the notification as described in connection with FIG. 1, FIG. 2, and/or FIG. 3.

While various examples of systems and methods are described herein, the systems and methods are not limited to the examples. Variations of the examples described herein may be implemented within the scope of the disclosure. For example, operations, functions, aspects, or elements of the examples described herein may be omitted or combined.

The invention claimed is:

1. A method, comprising:
   determining, by a processor, a flow state of a user based on biometric data from a biometric sensor in an extended reality device;
   determining, by the processor, a modality for notification delivery based on the flow state; and
   delivering, by the processor, the notification using the modality,
   wherein:
      determining the modality for notification delivery comprises determining a distance in a virtual space for notification delivery based on the flow state,
      determining the distance comprises determining a first distance in response to determining that the user is in the flow state, and
      determining a second distance in response to determining that the user is not in the flow state, and
   wherein the first distance is greater than the second distance.

2. The method of claim 1, wherein determining the flow state comprises determining a cognitive load or an emotional response based on the biometric data.

3. The method of claim 1, wherein determining the flow state comprises determining a work progress indicator.

4. The method of claim 3, wherein determining the work progress indicator is based on input device events.

5. The method of claim 3, wherein determining the work progress indicator is based on data from an application.

6. The method of claim 1, wherein determining the flow state comprises aggregating a plurality of previous flow state indications within a period.

7. The method of claim 1, wherein determining the modality comprises selecting the modality from a set of modalities including an audio modality, a visual modality, and a haptic modality.

8. The method of claim 1, wherein determining the modality for notification delivery comprises selecting a visual modality for the notification of a phone call in response to determining that the user is in the flow state.

9. The method of claim 1, further comprising utilizing a default modality for notification delivery in response to determining that the user is not in the flow state.

10. A non-transitory tangible computer-readable medium storing executable code, the executable code when executed by a processor, causes the processor to perform the method of claim 1.

11. An apparatus, comprising:
    a processor to:

determine, based on biometric data from a biometric sensor in an extended reality device, a flow state of a user;
determine, based on the flow state, a modality for delivery of a notification; and
deliver, using the modality, the notification,
wherein the processor is to:
determine, when the processor determines the modality, a distance in a virtual space for the delivery,
determine, when the processor determines that the user is in the flow state, the distance as being a first distance, and
determine, when the processor determines that the user is not in the flow state, the distance as being a second distance, and
wherein the first distance is greater than the second distance.

12. The apparatus of claim 11, wherein the processor is to: determine, when determining the flow state, a cognitive load or an emotional response based on the biometric data.

13. The apparatus of claim 11, wherein the processor is to: determine, when determining the flow state, a work progress indicator.

14. The apparatus of claim 13, wherein the processor is to: determine the work progress indicator based on input device events.

15. The apparatus of claim 13, wherein the processor is to: determine the work progress indicator based on data from an application.

16. The apparatus of claim 11, wherein the processor is to: aggregate, when determining the flow state, a plurality of previous flow state indications within a period.

17. The apparatus of claim 11, wherein the processor is to: select, when determining the modality, the modality from a set of modalities including an audio modality, a visual modality, and a haptic modality.

18. The apparatus of claim 11, wherein the processor is to: select, when determining the modality, a visual modality for the notification of a phone call in response to determining that the user is in the flow state.

19. The apparatus of claim 11, wherein the processor is to: utilize a default modality for notification delivery in response to determining that the user is not in the flow state.

* * * * *